(12) United States Patent
Bruening et al.

(10) Patent No.: US 6,221,476 B1
(45) Date of Patent: Apr. 24, 2001

(54) POLYMERIC MEMBRANES FUNCTIONALIZED WITH POLYHYDROXYPYRIDINONE LIGANDS

(75) Inventors: Ronald L. Bruening; Krzysztof E. Krakowiak, both of American Fork, UT (US); Anthony J. Dileo; Bipin S. Parekh, both of Bedford, MA (US)

(73) Assignees: IBC Advanced Technologies, Inc., American Fork, UT (US); Millipore Corporation, Bedford, MA (US)

( * ) Notice: Subject to any disclaimer, the term of this patent is extended or adjusted under 35 U.S.C. 154(b) by 0 days.

(21) Appl. No.: 09/330,543

(22) Filed: Jun. 11, 1999

(51) Int. Cl.$^7$ .............................. B32B 3/26; B01D 11/00; B01D 63/00
(52) U.S. Cl. .................................. 428/305.5; 210/502.1; 210/635; 210/651; 210/654; 210/681; 428/422; 428/423.1; 428/500; 428/523; 428/543
(58) Field of Search ................................ 428/305.5, 422, 428/423.1, 500, 523, 543; 210/502.1, 635, 651, 654, 681

(56) References Cited

U.S. PATENT DOCUMENTS

| | | |
|---|---|---|
| 4,618,533 | 10/1986 | Steuck . |
| 4,698,431 | 10/1987 | Raymond et al. . |
| 5,547,760 | 8/1996 | Tarbet et al. . |
| 5,618,433 | 4/1997 | Tarbet et al. . |
| 5,624,901 | 4/1997 | Raymond et al. . |

OTHER PUBLICATIONS

J.R. Telford and K.N. Raymond; Comprehensive Supramolecular Chemistry, vol. 10, Ed. by D.N. Reinhoudt, Pergamon Press, 1996, pp. 245–266 (Month unknown).

K.N. Raymond; Ferric Ion Sequestering Agents. 13. Synthesis, Structures, and Thermodynamics og Complexion of Cobalt (III) and Iron (III) Tris Complexes Several Chelating Hydroxypyridinones; Inorganic Chemistry, vol. 24, 1985, pp. 954–967 (Month unknown).

P.D. Taylor; Novel 3–Hydroxy–2(1H)–pyridinones. Synthesis, Iron(III)–Chelating Properties, and Biological Activity; Journal of Medicinal Chemistry, vol. 33, 1990, pp. 1749–1755 (Month unknown).

K.N. Raymond, Specific Sequestering Agents for te Actinides. 21. Synthesis and Initial Biological Testing of Octadentate Mixed Catecholate–Hydroxypyridinonate Ligands, Journal of Medicinal Chemistry, vol. 36, 1993; pp. 504–509 (Month unknown).

Jide Xu, Sonya J. Franklin, Donald W. Whisenhunt, Jr., & Kenneth N. Raymond;Gadolinium Complex of Trist [(3–hydroxy–1–methyl–2–oxo–1, 2–didehydropyridine–4–carboxamido)ethyl]–amine: A New Class of Gadolinium Magnetic Resonance Relaxation Agents, Journal of the American Chemical Society, vol. 117, 1995, pp. 7245–7246 (Month unknown).

*Primary Examiner*—Blaine Copenheaver
(74) *Attorney, Agent, or Firm*—Thorpe North and Western, LLP

(57) ABSTRACT

Compositions and methods for selectively binding metal ions from a source solution comprise using a polyhydroxypyridinone-containing ligand covalently bonded to a membrane support having the formula M—A—L(HOPO)$_n$. M is a membrane having a hydrophilic surface, A is a covalent linkage mechanism, L is a ligand carrier, HOPO is a hydroxypyridinone appropriately spaced on the ligand carrier to provide a minimum of six functional coordination metal binding sites, and n is an integer of 3 to 6. The separation is accomplished by passing a source solution containing the ions to be separated through a cartridge containing the membrane-ligand composition, causing the selected ions to be complexed to the HOPO ligands and subsequently removing the selected ions from the cartridge by passing an aqueous receiving solution through the cartridge and quantitatively stripping the selected ions from the HOPO ligand.

36 Claims, No Drawings

POLYMERIC MEMBRANES FUNCTIONALIZED WITH POLYHYDROXYPYRIDINONE LIGANDS

BACKGROUND OF THE INVENTION

Effective methods for the recovery and/or separation of particular ions such as the transition, post-transition, lanthanide and radioactive actinide metal ions from solution mixtures of these and other metal ions, are of great importance in modern technology. It is particularly difficult to remove these particular metal ions in the presence of moderate to strong acids and soluble complexing or chelating agents, such as the halide ions, which have a high affinity for the desired metal ions. It is also difficult to remove the mentioned desired metal ions when they are present at low concentrations in solutions containing other metal ions at much greater concentrations. Hence, there is a real need for a process to selectively concentrate certain transition, post-transition, lanthanide and actinide metal ions when present at low concentrations and in the presence of acid solutions and other complexing agents.

It is known that siderophores (compounds manufactured by microorganisms to sequester $Fe^{3+}$ ions) are commonly composed of hydroxamate- and catecholate-containing molecules. Formulas 1 and 2 show these structures.

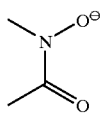

Formula 1

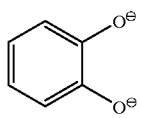

Formula 2

A modern review of the siderophores is found in an article by J. R. Telford and K. N. Raymond, "Comprehensive Supramolecular Chemistry," vol. 10, Ed. by D. N. Reinhoudt, Pergamon Press, 1996, pp. 245–266. Many synthetic iron chelating agents have been prepared in an effort to find pharmaceutical compounds that will increase the excretion of iron from iron-overloaded patients. Some of the synthetic chelating agents contain the hydroxypyridinone structure as depicted by 3-hydroxy-2(1H)-pyridinone (Formula 3), 1-hydroxy-2(1H)-pyridinone (Formula 4), and 3-hydroxy-4(1H)-pyridinone (Formula 5).

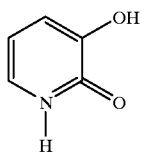

Formula 3

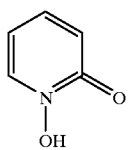

Formula 4

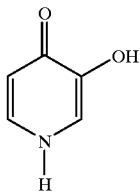

Formula 5

These chelating agents often have other substituents, such as carboxyl groups in positions 3, 4, 5, or 6 of the compound in Formula 4 or alkyl and carboxymethyl groups on the nitrogen atoms of the compounds in Formulas 3 and 5. These hydroxypyridinone structures are excellent complexing agents for $Fe^{3+}$ because the pyridone carbonyl oxygen atoms withdraw electron density and have a partial negative charge as shown in the resonance structures for 1-hydroxy-2(1H)-pyridinone below.

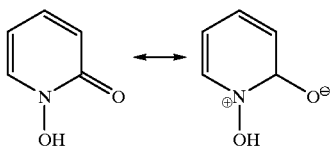

Equation 1

Thus, these materials resemble the hydroxamate molecules that have a high affinity for $Fe^{3+}$. The synthesis and $Fe^{3+}$ ion-complexing properties of these types of compounds are found in the article by K. N. Raymond and his coworkers, "Ferric Ion Sequestering Agents. 13. Synthesis, Structures, And Thermodynamics of Complexation of Cobalt(III) And Iron(III) Tris Complexes of Several Chelating Hydroxypyridinones," Inorganic Chemistry, Volume 24, 1985, pp. 954–967; and in the article by P. D. Taylor and his Coworkers, "Novel 3-hydroxy-2(1H)-pyridinones. Synthesis, Iron(III)-chelating Properties And Biological Activity," Journal of Medicinal Chemistry, Volume 33, 1990, pp. 1749–1755. K. N. Raymond and his coworkers have found that having more than one of these chelating groups bonded to a polyamine such as 1,5,10,14-tetraazatetradecane improves their affinity for $Fe^{3+}$ and allows complex formation with the actinides. Bonding to the polyamine is through the formation of amide bonds as shown in following Formula 6.

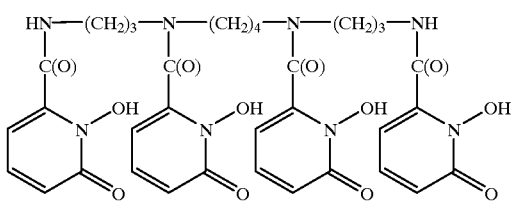

Formula 6

The octadentate ligand shown above in Formula 6 has a high affinity for Fe(III), Am(III), Pu(IV) and Np(V) as reported in articles by K. N. Raymond and coworkers, "Specific Sequestering Agents For The Actinides. 21. Synthesis And Initial Biological Testing of Octadentate Mixed Catecholate-hydroxypyridinoate Ligands," Journal of Medicinal Chemistry, Volume 36, 1993, pp. 504–509; and "In Vivo Chelation of Am(III), Pu(IV), Np(V) And U(VI) in Mice by Tren-(Me-3,2-HOPO)," Radiation Protection Dosimetry, Volume 53, pp. 305–309. A similar polyamine material containing three Formula 3 HOPO molecules formed strong interactions with gadolinium, calcium and zinc as shown in the article by J. Xu, S. J. Franklin, D. W. Whisenhunt, Jr., and K. N. Raymond, "Gadolinium Complex of Tris[(3-hydroxy-1-methyl-2-oxo-1,2-didehydropyridine-4-carboxamido)ethyl]amine: A New Class of Gadolinium Magnetic Resonance Relaxation Agents," Journal of the American Chemical Society, Volume 117, 1995, pp. 7245–7246. The synthesis of hydroxypyridinonate chelating agents, such as that shown above in Formula 6, is shown by Raymond et al., U.S. Pat. No. 4,698,431, issued Oct. 6, 1987. The materials described in this patent and the above cited articles are directed only to the hydroxypyridinonate molecules or those bound to simple amines. Attachment of from one to four HOPO rings to a molecular or polymeric backbone through amide linkages is taught by Raymond et al., U.S. Pat. No. 5,624,901, issued Apr. 29, 1997. At least one of the HOPO rings must be a 3,2-HOPO ligand. Tetra-, hexa- and octadentate ligands (i.e. two to four HOPO substituents) are illustrated being attached to a polyamine linking backbone. There is also an allegation that a polymeric backbone, such as poly (styrenedivinylbenzene), agarose and polyacrylamide, having amine functionalities, can be used to which a HOPO substituent can be directly bonded via an amide-type linkage. There is no teaching or suggestion that a tetra-, hexa- or octadentate HOPO ligands, attached to a backbone carrier, can be covalently attached to a polymeric or inorganic solid support through the backbone carrier by appropriate linkage means.

The ability to complex $Fe^{3+}$, $Pu^{4+}$, $Th^{4+}$, $Zr^{4+}$, lanthanides, actinides and other metal ions under increasing acidities and competing matrix complexers or chelants requires the interactive strength of six to eight donor atoms, of which there are two per HOPO ring, and the proper molecular spacing of these HOPO rings. The ability to use this interactive strength to perform an actual separation requires that three or more HOPO moieties with appropriate molecular spacing be attached via a stable covalent bond to a hydrophilic membrane support in such a manner that the HOPO moieties cooperate in such a manner to maximize their collective binding abilities.

SUMMARY OF THE INVENTION

The present invention provides a composition and method for the removal of desired transition, post-transition, actinide and lanthanide metal ions present in low concentrations from a solution utilizing compositions comprising three or more hydroxylpyridinonate (HOPO) containing ligands the composite of which are appropriately spaced so as to contain the interactive strength of six or more coordination binding sites, preferably six to eight. The HOPO containing ligands are covalently bonded to a hydrophilic membrane support via an appropriate attachment mechanism.

This invention also provides a composition and method of maximizing the complexing abilities of ligands containing three or more HOPO binding moieties by the preparation of ligands wherein the HOPO moieties are properly spaced on a ligand carrier and the ligand is attached to a hydrophilic membrane via an appropriate attachment mechanism.

The compositions of the present invention comprise suitable ligands containing three or more HOPO groups, such as the HOPO groups noted above, which are covalently bonded to a hydrophilic membrane as represented by the following Formula 7:

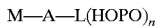

Formula 7 wherein M is any membrane or composite membrane derivatized to have a hydrophilic surface and contains polar functional groups, $L(HOPO)_n$ is a ligand comprising a ligand carrier L having bound thereto three HOPO groups wherein the ligand carrier L is configured such that the HOPO groups are appropriately spaced on the ligand carrier to provide six or more functional coordination binding sites and A is the covalent linkage joining L to the membrane surface. Typically, ligand $L(HOPO)_n$ is joined to the membrane surface by the reaction of ligand precursor XL $(HOPO)_n$ where X is a functional group which reacts with an activated polar group on the membrane surface, thereby forming covalent linkage A. Representative of A linkages are members selected from the group consisting of amide (—NHC(O)—), ester (—C(O)O—), thioester (—C(O)S—), carbonyl (—C(O)—), ether (—O—), thioether (—S—), and sulfonamide (—SO₂NH—).

In the above Formula 7, n is an integer of at least three and may range from about 3 to 6. Preferably n is an integer of 3 or 4. Preferably the HOPO groups are positioned on carrier L such that there are at least two and preferably at least four atoms on carrier L separating the attached HOPO groups to provide the appropriate stereoconfiguration to optimize the HOPO binding sites. When considering the atoms separating the HOPO groups, the hydrogen atom is not taken into consideration. When the ligand carrier L is non-cyclic the HOPO groups on the carrier will preferably be spaced apart by 4 to 6 atoms and when the ligand carrier is an amine the HOPO groups will separated by four or more non-hydrogen atoms. Preferably the carrier is a polyamine wherein an amine functionality on the ligand carrier interacts with an active functional group on the hydroxypyridinone to form a covalent bond. Representative ligand carriers illustrated in the examples below include members selected from the group consisting of tetrakis(aminomethyl)methane; tetrakis (5-amino-2-oxa-pentyl)methane; 25,26,27,28-tetrakis [(aminobutyl)oxy]calix[4]arene; 1,4,8,12-tetrazacyclopendadecane and triethylenetetraamine. The above ligand carriers are exemplary only and any carrier to which an HOPO moiety can be appropriately spaced and bonded, such that the metal coordination sites of the HOPO moiety can be utilized in ion binding, are within the scope of the invention.

Functional hydroxypyridinone structures are shown in Formulas 3, 4 and 5 and, regardless of their positions on the pyridinone ring, always comprise adjacent hydroxy and oxo groupings. This provides the HOPO group with a sequestering functionality similar to the siderophores shown in Formulas 1 and 2. Formula 3 shows a 3-hydroxy-2(1H)-pyridinone, Formula 4 shows a 1-hydroxy-2(1H)-pyridinone and Formula 5 shows a 3-hydroxy-4(1H)-pyridinone. In addition to the hydroxy and oxo functions, at least one other ring atom contains a functional grouping through which a covalent bond can be formed to attach the HOPO group to the ligand carrier to provide the overall multi-HOPO containing ligand. Preferably, when attached to a carbon atom of the HOPO ring, the functional group will be a carboxylic acid group that will react through amidation or esterification with an amino or hydroxy group of the ligand carrier. When the functional group is attached to the nitrogen atom of the pyridinone ring it will preferably be an alkyl or carboxyalkyl group. Carboxylic acid functional groups that react with an amine function on the ligand carrier forming an amide bond are particularly preferred.

In order for the HOPO groups of the —L(HOPO)$_n$ portion of Formula 7 to function with optimal binding selectivity, it is important that the stereoconfiguration of the HOPO moieties be such that the coordination sites of each HOPO ring can function optimally for the binding and removal of the desired ions. At the same time, it is vital that the —L(HOPO)$_n$ functionality be firmly anchored to a solid support such that desired ions removed from solutions can be complexed to the binding ligands and then, optionally, subsequently released in such a manner that the binding/release process can be repeatedly utilized as desired. This is accomplished by means of the M—A— portion of Formula 7.

Membranes that may be used are inherently hydrophilic, partially hydrophilic or are composites of a porous polymer membrane substrate having an insoluble cross-linked hydrophilic coating deposited thereon. Membranes that are inherently hydrophilic, or partially hydrophilic, and contain moieties appropriate for forming covalent bonds with ligand carrier L are preferred. Such membranes include polyamides, such as nylon, and cellulosic materials, such as cellulose, regenerated cellulose, cellulose acetate, and nitrocellulose. If the membrane used does not contain reactive groups it may be modified or derivatized appropriately. As noted above, composite membranes are also useful. A composite membrane comprises a porous polymer membrane substrate and an insoluble, cross-linked coating deposited thereon. Representative suitable polymers forming the membrane substrate include fluorinated polymers including poly(tetrafluoroethylene) ("TEFLON"), polyvinylidene fluoride (PVDF), and the like; polyolefins such as polyethylene, ultra-high molecular weight polyethylene (UPE), polypropylene, polymethylpentene, and the like; polystyrene or substituted polystyrenes; polysulfones such as polysulfone, polyethersulfone, and the like; polyesters including polyethylene terephthalate, polybutylene terephthalate, and the like; polyacrylates and polycarbonates; and vinyl polymers such as polyvinyl chloride and polyacrylonitriles. Copolymers can also be used for forming the polymer membrane substrate, such as copolymers of butadiene and styrene, fluorinated ethylene-propylene copolymer, ethylene-chlorotrifluoroethylene copolymer, and the like.

The membrane is selected to yield both selected bulk properties and selected surface properties. For naturally hydrophilic membranes, the selected bulk and surface properties will be provided by whatever polymer that comprises the membrane. For composite membranes, the selected bulk properties will be provided by the membrane substrate and the selected surface properties will be provided by the coating. A composite membrane is formed by depositing a monomer directly on the surface of the substrate, including the inner surfaces of the pores, by in situ deposition of the cross-linked monomer. The desired deposition of the cross-linked monomer onto the porous substrate is effected as a direct coating and does not require or utilize an intermediate binding chemical moiety. Any monomer for the coating polymer can be used so long as it is capable of being polymerized by free radical polymerization and can be crosslinked. The only requirements of the polymerized monomer is that it is capable of coating the entire surface of the porous membrane, that it provide the surface with ligand-reactive functional groups, and that it be sufficiently hydrophilic to allow for efficient use of the ligand to be attached. Generally, the porous substrate has an average pore size between about 0.001 and 10 m, and more usually, between about 0.1 and 5.0 m. The composite membrane is formed by any suitable method, such as is disclosed in U.S. Pat. No. 4,618,533, which is hereby incorporated by reference. Briefly, this procedure involves washing the porous membrane substrate with a suitable solvent for wetting the entire surface of the substrate. The substrate is then bathed in a mixture of the free radical polymerizable monomer, a polymerization initiator, and a cross-linking agent in a solvent under conditions to effect free radical polymerization of the monomer and coating of the porous substrate with the cross-linked polymer. The surface of the coated polymer membrane contains hydrophilic or polar-substituents that can be activated to react with and covalently bond the ligands to the membrane surface.

The composite membranes prepared according to U.S. Pat. No. 4,618,533 can contain carboxylic acid moieties on the surface. Other suitable moieties could include hydroxyl, sulfonic acid, epoxy, primary amine, and derivatized benzyl groups such as polymers referenced above.

Preparation of a composite membrane by a precipitated crystal technique involves, briefly, washing the porous membrane substrate with a suitable solvent for wetting the entire surface of the substrate. The substrate is then bathed in a solution containing the compound which is to be precipitated. This solution is then removed and the membrane substrate is treated with a compound that precipitates and fixes the crystals to the substrate. The membrane is washed and dried before use.

The M—A— portion of Formula 7 is well known for use with ion binding ligands and is more specifically shown in U.S. Pat. No. 5,547,760, issued Aug. 20, 1996, and U.S. Pat. No. 5,618,433, issued Apr. 8, 1997, which are incorporated herein by reference. These patents adequately illustrate to those skilled in the art the relevant chemistry in covalently bonding an ion binding ligand to a membrane.

It is to be emphasized that the present invention does not reside in the discovery of the M—A— portion of Formula 7. Rather, it is the discovery of the advantageous ion binding capabilities of the L(HOPO)$_n$ ligand when attached to a membrane M via a A covalent linkage.

The properly spaced polyhydroxypyridinone ligands covalently bonded to membranes as shown in Formula 7 are characterized by high selectivity for and removal and separation of desired metal ions or groups of desired metal ions, such as several transition, post-transition, lanthanide and actinide metal ions, including particularly $Fe^{3+}$, $Al^{3+}$, $Zr^{4+}$, $Th^{4+}$, $Pu^{4+}$, $Am^{3+}$, $Cm^{3+}$, $Ac^{3+}$, and the lanthanides present at low concentrations from source solutions containing a mixture of these desired metal ions with the ions one does not desire to remove which may be present in much greater concentrations in the source solution including hydrogen ions. The separation is effected in a separation device such as a membrane cartridge through which the source solution is flowed. The process of selectively removing and concentrating the desired metal ions is characterized by the ability to selectively and quantitatively complex the desired metal ions to the properly spaced polyhydroxypyridinone ligand portion of the membrane support system, from a large volume of solution, even though the desired metal ions may be present at low concentrations. The desired ions thus separated can, optionally, be subsequently recovered from the membrane cartridge by flowing through it a small volume of a receiving phase which contains a solubilized reagent which need not be selective, but which will quantitatively dissociate the desired ions from the hydroxypyridinone ligands. The recovery of the desired metal ions from the receiving phase is easily accomplished by known procedures.

Moreover, the above described ligands covalently bonded to membrane supports as shown in Formula 7 provide a means for separating parts-per-billion (ppb) to parts-per-million (ppm) levels of $Fe^{3+}$ from 1% to 5% HF or $NH_4F$ by using the separation techniques described above. The solid supported ligands of this invention are also useful in separating Pu(IV), Th(IV), Zr(IV), and Hf(IV) from >1M nitric acid solutions and in separating other acid solutions of actinides and lanthanides containing large amounts of other cations. The above described membrane supported ligands are also effective in separating Cu, Ni, Zn, Cd, Pb, Ag, Hg and others as wastes from less acidic feed streams such as potable water or industrial effluents.

DETAILED DESCRIPTION OF THE INVENTION

As summarized above, the present invention is drawn to novel properly spaced polyhydroxypyridinone-containing ligands covalently bound to membrane support materials to form the compositions of Formula 7. The invention is also drawn to the concentration and removal of certain desired metal ions, such as certain transition, post-transition, lanthanide and actinide metal ions, from other metal ions in water supplies and waste solutions, such as ions of Fe, Pu, Th, Zr, Hf, other lanthanides and actinides, Bi, and Sb from acidic and/or highly complexing or chelating matrices and Cu, Al, Ga, Ni, Zn, Cd, Pb, Ag, and Hg ions from slightly acidic to neutral pH matrices and other chelating matrices. Moreover, the above described ligands covalently bonded to membrane supports as shown in Formula 7 provide a means for separating ppb to ppm levels of Fe from concentrated 1% to 5% HF and $NH_4F$ by using the separation techniques described above. The process of the invention is particularly adaptable to recovery of metal ions from solutions containing large amounts of hydrogen ions and other ligating anions such as fluoride. Such solutions from which such ions are to be concentrated and/or recovered are referred to herein as "source solutions." In many instances the concentration of desired ions in the source solutions will be much less than the concentration of other metal ions from which they are to be separated.

The concentration of desired ions is accomplished by forming a complex of the desired ions with a polyhydroxypyridinone-containing ligand membrane support composition shown in Formula 7 and flowing a source solution containing the desired ions through a column packed with a polyhydroxypyridinone ligand-membrane support composition to attract and bind the desired metal ions to the polyhydroxypyridinone ligand portion of such composition to form a ligand-metal ion complex, and subsequently dissociating the ligand-metal ion complex by flowing a receiving liquid in much smaller volume than the volume of source solution passed through the membrane cartridge to remove and concentrate the desired ions in the receiving liquid solution. The receiving liquid or recovery solution forms a stronger complex with the desired transition, post-transition lanthanide or actinide metal ions than does the polyhydroxypryidinone ligand and thus the desired metal ions are quantitatively stripped from the hydroxypyridinone ligand-containing membrane support composition in concentrated form in the receiving solution. The recovery of desired metal ions from the receiving liquid can be accomplished by known methods.

EXAMPLES

The following examples illustrate the preferred embodiments of the invention that are presently best known. However, other embodiments may be made within the scope of the disclosure. In certain of the examples, reaction schemes are given that are general in nature and reference to the text of each example may be necessary to clarify each reactant, reaction step, reaction condition and product obtained. Reactants utilized and/or products prepared are identified by the number of the example followed by an alphabetical designation in which each was first used, i.e. "1A" is the first reactant or product identified in Example 1, "1B" is the second, etc. All NMR spectra were obtained on QE 300 (300 MHZ) spectrophotometer.

Example 1

Preparation of 1-hydroxy-2-(IH)-pyridinone-6-carboxylic acid (1C)

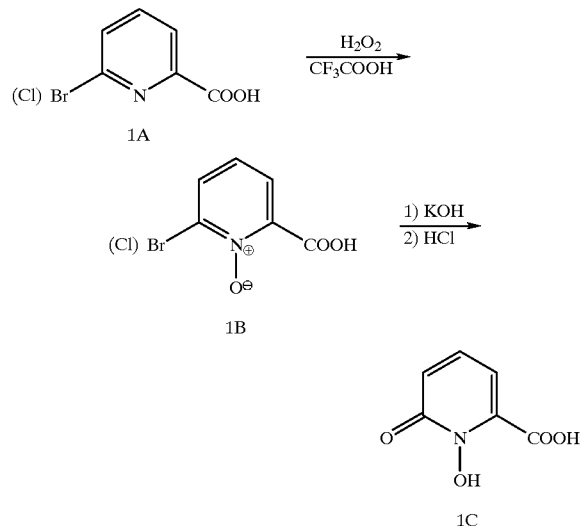

The starting material used for this reaction can be either 6-chloro or 6-bromo-pyridine-2-carboxylic acid. The chloro derivative is preferred and is illustrated here. A 643 g (4.08 mole) portion of 6-chloro-pyridine-2-carboxylic acid (1A) was added to a solution of 10.6L of $CF_3COOH$ and 1530 mL of 30% $H_2O_2$ and heated to 80° C. for 6.5 hrs. The reaction mixture was concentrated to about 2100 mL by rotary evaporation and then added to 1 L of water. The product immediately precipitated as a finely divided, white crystalline solid. It was isolated by filtration, washed with water, and dried in vacuo. This yielded 687 g of 2-chloropyridine-2-carboxylic acid (1B), mp 180° C. dec. $^1$HNMR (DMSO-$d_6$): S 8.20 (m.2H), 7.80 (m, 1H), -2.70 (broad S, 1H).

A 687 g (3.96 mole) portion of the 2-chloro-pyridine-6-carboxylic acid (1B) prepared above was dissolved in 15 L of a 10% aqueous KOH solution, and the resulting solution was maintained at 80° C. overnight and then cooled in an ice bath and treated with 7.2 L of concentrated HCl. The white suspended solid was isolated by filtration, washed with dilute HCl followed by three 1.3 liter portions of water, and then dried in vacuo to yield 530 g (86%) of 1-hydroxy-2-(IH)-pyridinone-6-carboxylic acid (1C). mp 216° C. dec. $^1$HNMR (DMSO-d6): S 13.02 (broad s, 2H), 7.44 (m, 1H), 6.73 (d, J=9.5 Hz, 1H), 6.65 (d, J=7.5 Hz, 1H).

Examples 2–4 illustrate the preparation of ligand carriers.

Example 2

Preparation of tetrakis(aminomethyl)methane (TAM)(2C)

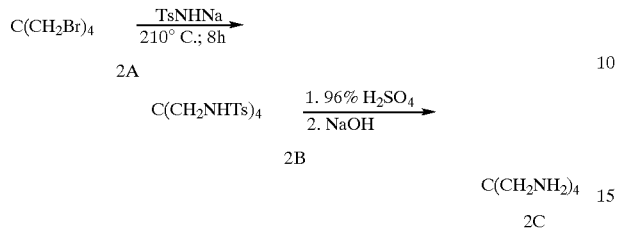

Example 3

Preparation of tetrakis(5-amino-2-oxa-pentyl)methane (3C).

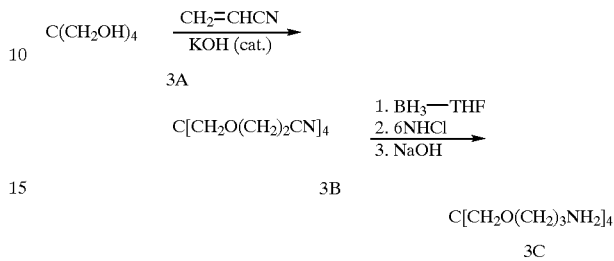

A 250-mL three-necked reaction flask, equipped with a mechanical stirrer and a thermometer, was heated in an oil bath to 210° C. Pentaery-thrityl tetrabromide (2A) was ground well with the sodium salt of p-toluenesulfonamide and added in four (equal) amounts to the preheated reaction vessel while stirring. The reaction mixture formed a viscous melt within 40 minutes (oil bath 230° C. by electro-thermometer). The melt was maintained under stirring at 210° C. for 8 hrs. Pentaerythrityl tetrabromide sublimity on the cooler parts of the reaction flask was melted down occasionally by pumping hot oil from the oil bath. The reaction mixture was cooled to 180° C. under stirring and then allowed to cool to room temperature. Acetic acid (70% v/v, 60 mL) was added to the reaction flask equipped with a reflux condenser and the contents refluxed until the hard reaction mixture disintegrated into a fine white suspension. The mixture was washed several times with hot water to remove sodium bromide and p-toluenesulfonamide. The resulting white crystalline powder weighed 50 g (62%) and was found to be pure tetratosylate of TAM (2B). mp 248° C. $^1$HNMR (CHCl$_3$): S 7.70 (d, J=9.0 Hz, 8H), S 7.33 (d, J=9.0 Hz, 8H), 5.40 (t, J=6.7 Hz, 4H, NH), 2.68 (d, J=6.7 Hz, 8H), 2.44 (S, 12H).

Concentrated sulfuric acid was taken in a three-necked flask equipped with a mechanical stirrer and heated to 160° C. in an oil bath. The powdered tosylate (2B) from above was added in small lots over 40 minutes. The tosylate dissolved immediately to form a clear solution and the temperature rose to 180° C. The reaction mixture was maintained at 180° C. for 30 minutes. After cooling to room temperature and pouring into 30% v/v ethanol, the white crystalline solid formed was allowed to settle. The supernatant was decanted off and the precipitate was dissolved in a minimum amount of 10% sodium hydroxide and filtered to remove any insoluble material. The filtrate was evaporated to dryness. The residue was treated with methanol and the solid was filtered off and the filtrate was evaporated to dryness with the help of toluene. The pure TAM product (2C) was obtained by distillation at 110° C./0.4 mm Hg in yield of 76% (2.50 g). mp 70° C. $^1$H NMR (CDCl$_3$): S 2.58 (S, 8H), 1.11 (S, 8H, NH$_2$).

A mixture of 13.62 g (0.10 mole) of pentaerythritol (3A) and 1 g of a 40% Ag/KOH catalyst was stirred while 42.45 g (0.80 mole) of acrylonitrile was added at a rate such that the temperature did not exceed 35° C. The mixture was stirred an hour after all the acrylonitrile was added and poured into 200 mL of water. The resulting mixture was stirred for one hour, which allowed the excess acrylonitrile to polymerize completely. The polymer was removed by filtration and washed with chloroform. The chloroform layer was washed with water two times more and dried over MgSO$_4$. The crude tetranitrile product (3B) (30 g) was produced by the evaporation of chloroform and directly used for the next reaction without further purification. $^1$HNMR (CDCl$_3$): S 3.78 (t, J=6.0 Hz, 8H), 3.59 (S, 8H), 2.69 (t, J=6.0 Hz, 8H).

To a solution of the crude tetranitrile (3B) (30 g, 0.10 mole) in HPLC grade THF (6.5 L) was added dropwise BH$_3$ (1M in THF, 1.4 L, 1.4 mole) under nitrogen. The reaction mixture was heated at 70° C. overnight. After being cooled, the solution was carefully quenched by the addition of water, and the mixture was stirred for 30 minutes at room temperature. The solvent was then distilled off, and the solid residue was heated to reflux in 6N HCl (800 mL) for 3 hrs while being cooled with an ice-water bath, and the acidic solution was basified to pH 13 with solid NaOH. The water was evaporated to dryness and the tetramine product (3C) was extracted with methanol from the residue. The methanol solution was evaporated to dryness again and trace water was removed by azeotropic distillation with toluene. The residue was treated with CH$_2$Cl$_2$ and filtered. The filtration was dried over K$_2$IO$_3$. After filtration, the methylene chloride solution was evaporated to dryness. The pure tetrakis (5-amino-2-oxapentyl)oxapentyl)methane (3C) was obtained by distillation under vacuo at 210° C./0.3 mmHg in a yield of 34% (10.7 g). $^1$HNMR (CDCl$_3$): S 3.43 (t, J=6.0 Hz, 8H), 3.35 (S, 8H), 2.76 (t, J=6.6 Hz, 8H), 1.67 (m, 8H).

Example 4

Preparation of 25,26,27,28-tetrakis[(aminobutyl)oxy]Calix[4]arene (4D).

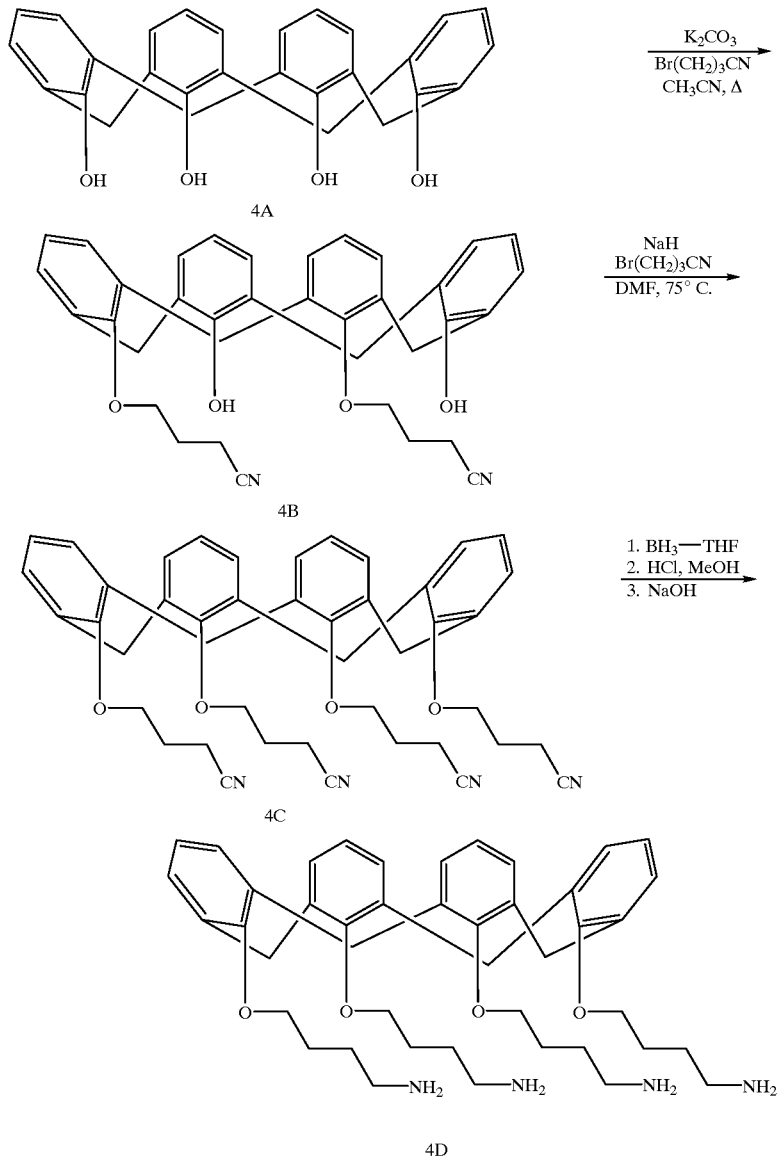

Calix[4]arene (4A) (3.56 g, 85 mmol), 4-bromobutyronitrile (2.60 g, 17.6 mmol), and potassium carbonate (1.39 g, 10.1 mmol) was refluxed in $CH_3CN$ (100 mL) for 5 days. The solvent was evaporated and the residue was taken up in $CH_2Cl_2$ (400 mL), washed with 1 N HCl (100 mL), $H_2O$ (60 mL), and brine (60 mL), and dried with $MgSO_4$. The $CH_2Cl_2$ was evaporated and the residue was recrystallized from $CHCl_3$/MeOH yielding a white solid 25,27-bis[(cyanopropyl)oxy]-26,28-dihydroxycalix[4]arene product (4B). Yield: 2.61 g (56%). $^1$HNMR (CDCl3): S 7.80 (S, 2H, OH), 7.20 (d, J=7.2 Hz, 4H), 6.92 (d, J=7.2 Hz, 4H), 6.75 (t, J=7.2 Hz, 2H), 6.66 (t, J=7.2 Hz, 2H), 4.18 (d, J=12.6 Hz, 4H) 4.10 (t, J=6.6 Hz, 4H), 3.42 (d, J=12.6 Hz, 4H), 3.10 (t, J=6.6 Hz, 4H), 2.40 (m, 4H).

NaH (1.13 g, 44.7 mmol) and the above 25,27-bis[(cyanopropyl)oxy]-26,28-dihydroxycalix[4]arene (4B) (2.50 g, 4.5 mmol) was stirred for 1 hr. at room temperature in DMF (100 mL). 4-Bromobutyronitrile (6.63 g, 44.7 mmol) was added and the mixture was stirred at 75° C. for 20 hrs. The DMF was evaporated and the residue was taken up with $CH_2Cl_2$ (200 mLs) and washed with 1 N HCl (100 mL×2), saturated $NH_4Cl$ in $H_2O$ (100 mL×3), and saturated NaCl in $H_2O$ (100 mL), and dried with $MgSO_4$. After filtration, the $CH_2Cl_2$ was evaporated and the residue was purified by silica gel column ($CH_2Cl_2$/MeOH=250/)1 and then recrystallized from MeOH with a yield of 0.43 g (15%) yield 25,26,27 28-tetrakis[(cyanopropyl)oxy]calix[4]arene (4C). $^1$HNMR (CDCl$_3$): 6.64 (S, 12H) , 4.32 (d, J=12.4 Hz, 4H) , 4.05 (t, J=6.5 Hz, 8H), 3.24 (d, J=12.4 Hz, 4H) 2.60 (t, J=6.5 Hz, 8H), 2.20 (m, 8H)

A mixture of the tetranitrile (4C) (0.43 g, 0.62 mmol) and 1M $BH_3$ in THF (10 mL, 10 mmol) was refluxed overnight. After being cooled, the solution was carefully quenched by the addition of water, and the mixture was stirred for 30 minutes at room temperature. The solvent was then distilled off, and the solid residue was heated to 65° C. in conc. HCl (10 mL) and MeOH (10 mL) for 2 hrs. After being cooled with an ice-water bath, the acidic solution was basified to pH ~13 with 2 N NaOH. After removal of $CH_3OH$, the product was extracted with $CH_2Cl_2$ from the aqueous solution. The $CH_2Cl_2$ solution was dried with $Na_2SO_4$. After filtering, the filtrate was evaporated to dryness to yield 0.36 g (82%) of 25,26,27,28-tetrakis[(aminobutyl)oxy]calix[4]arene. $^1H$ NMR (CDCL3): 7.10–6.10 (m, 12H), 4.22 (d, J=12.2 Hz, 4H), 4.06–3.58 (m, 16H), 3.32–2.78 (m, 12H), 2.10–1.08 (m, 16H). FAB mass spectrum, tm/e 732 ($M^++Na$, 18), 710 ($M^++H$, 46), 661 ($M^+CH_2CH_2CH_2NH_2+H+Na$, 41), 639 ($M^+CH_2CH_2CH_2NH_2+2H$, 100).

Examples 5–9 illustrate the preparation of tris(HOPO) amine ligands.

Example 5

Preparation of the Tris-HOPO-Amine Ligands

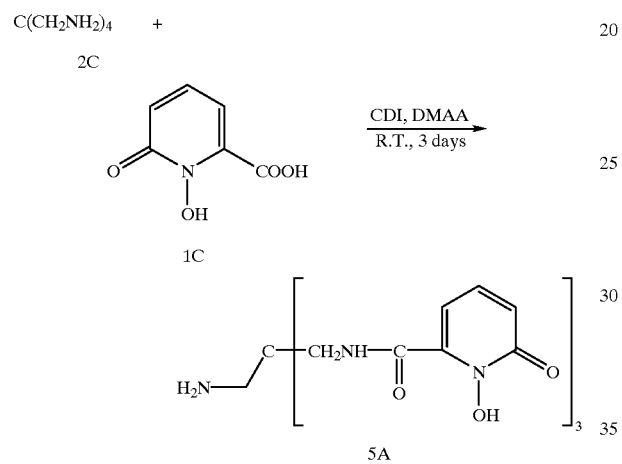

A solution of 1-hydroxy-2-(1H)-pyridinone-6-carboxylic acid (1C) (1.55 g, 10 mmol) from Example 1 in DMAA (50 mL) was stirred for 20 minutes. A solution of CDI (1.62 g, 10 mmol) in DMAA (50 mL) was added dropwise into the above solution. The mixture was stirred for 2 hrs. at room temperature. The ligand carrier tetrakis (aminomethyl) methane (2C) (0.38 g, 2.9 mmol) from Example 2 was added. The amidation reaction was allowed to go at room temperature for three days. The solvent was evaporated and the residue was dissolved in water (20 mL), then treated with THF (200 mL) to precipitate the tris(HOPO)amine ligand (5A) shown above. The solid was collected and washed with $CHCl_3$. After drying under vacuum at 50° C., the ligand (5A) 1-aminoethyl-2[tris(6-methyleneaminocarboxy-1-hydroxy-2-(1H)pyridinone)] weighed 1.35 g. $^1HNMR$ (DMSO-d6): 9.50 (broad S, 3H), 7.46–7.26 (m, 3H), 6.70–6.50 (m, 6H), 3.52–2.94 (m, 8H), 2.40 (S, 5H).

Example 6

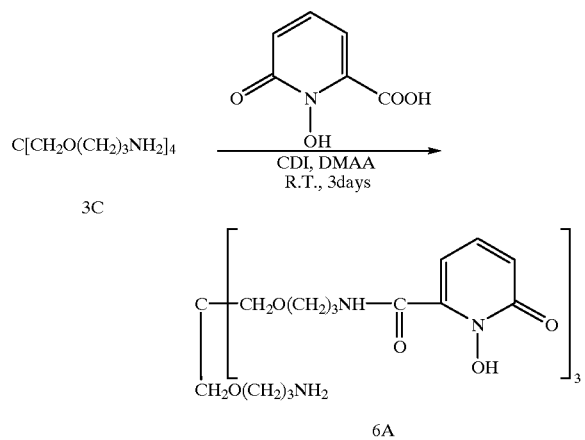

A solution of 1-hydroxy-2-(1H)-pyridinone-6-carboxylic acid (1C) (96.64 g, 0.62 mol) from Example 1 in DMAA (5.5 L) was stirred for 20 minutes and then a solution of CDI (103 g, 0.623 mol) in DMAA (400 mL) was added dropwise over half an hour. The mixture was stirred at room temperature for 2 hrs. The ligand carrier, tetrakis (5-amino-2-oxypentyl)methane (3C) 65.07 g, 0.178 mol) from Example 3 was added and the amidation reaction was allowed to carry out at room temperature for three days according to the reaction scheme shown above. The solvent was evaporated under vacuum at 60° C. and the residue was dissolved in 100 mL of methanol. Ethyl ether was poured into the methanol solution to precipitate the crude tris(HOPO)amine ligand product (6A). After being decanted the oily product was treated with a mixture of methanol and chloroform (1/1) and the insoluble impurity was filtered off. The filtrate was evaporated to dryness to afford 152 g of the purified tris (HOPO)amine ligand (6A). $^1HNMR$ (DMSO-d6): S 9.20 (broad m, 3H), 8.40 (broad S, 3H), 7.34–7.15 (m, 3H), 6.54–6.32 (m, 6H), 3.48–3.18 (m, 24H), 2.88 (m, 2H), 1.84–1.58 (m, 8H).

Example 7

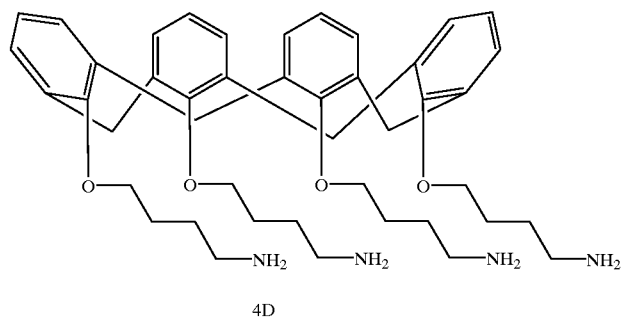

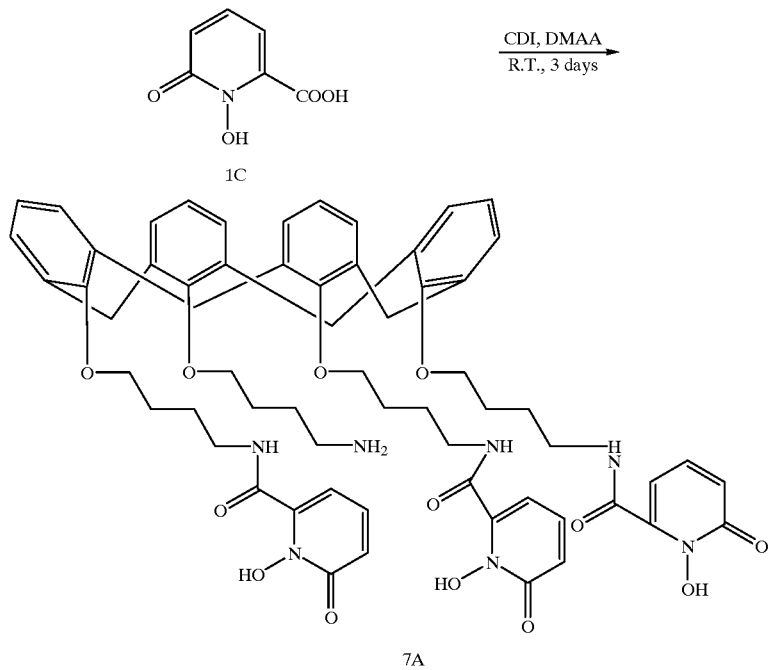

A solution of 1-hydroxy-2-pyridinone-6-carboxylic acid (1C) (0.29 g, 1.78 mmol) from Example 1 in DMAA (30 mL) was stirred for 20 minutes and then a solution of CDI (0.29 g, 1.78 mmol) in DMAA (30 mL) was added dropwise. The mixture was stirred at room temperature for 2 hrs. A solution of the carrier ligand 25,26,27,28-tetrakis[(aminobutyl)oxy]calix[4] arene (4D) (0.36 g, 0.51 mmol) from Example 4 in DMAA (20 mL) was added and the reaction was allowed to carry out at room temperature for three days as shown in the above reaction scheme. The solvent was evaporated under vacuum at 60° C. and the residue was treated with ethyl ether. After being decanted, the oily residue was dissolved in CHCl$_3$. Any insoluble impurity was removed by filtration and the filtrate was concentrated to dryness to afford 0.62 g of the purified tris(HOPO)amine ligand (7A). ¹HNMR (CDCl3): S 7.68 (m, 3H), 7.32–6.16 (m, 21H), 4.32 (m, 4H), 4.00–3.02 (m, 23H), 2.28 (broad S, 2H), 2.14–1.40 (m, 12H).

Example 8

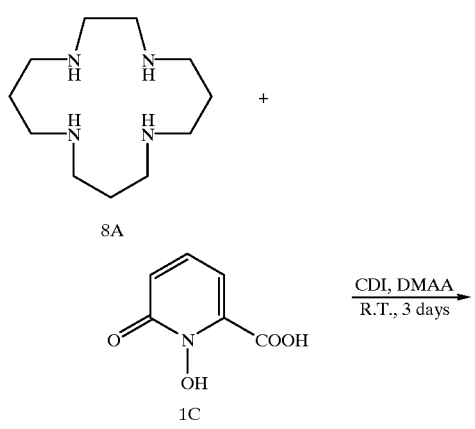

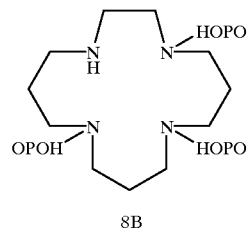

A solution of 1-hydroxy-2-(1H)-pyridinone-6-carboxylic acid (1C) (1.55 g, 10 mmol) from Example 1 in DMAA (50 mL) was stirred for 20 min. Then a solution of DCI (1.62 g, 10 mmol) in DMAA (50 mL) was added dropwise. The mixture was stirred at room temperature for 2 hrs. A solid ligand carrier, 1,4,8,12-tetraazacyclopentadecane, (8A) (0.61 g, 2.9 mmol) was added and the amidation reaction was allowed to carry out at room temperature for three days as shown in the above reaction scheme. The tris(HOPO) cyclam ligand (8B), as shown, results from the amidation reaction between the 6 carboxylic acid on the HOPO ring with three of the N—H functionalities of the tetraazacyclopendadecane. The solvent was evaporated under vacuum at 60° C. and the residue was treated with methanol. The solid was collected and washed with methanol and chloroform. After being dried under vacuum at 50° C. it afforded 1.96 g of tris(HOPO)cyclam ligand (8B). ¹HNMR (DMSO-16): 7.42–7.04 (m, 3H), 6.56–5.98 (m, 6H), 3.8–2.56 (m, 20H), 2.12–1.60 (m, 6H).

Example 9

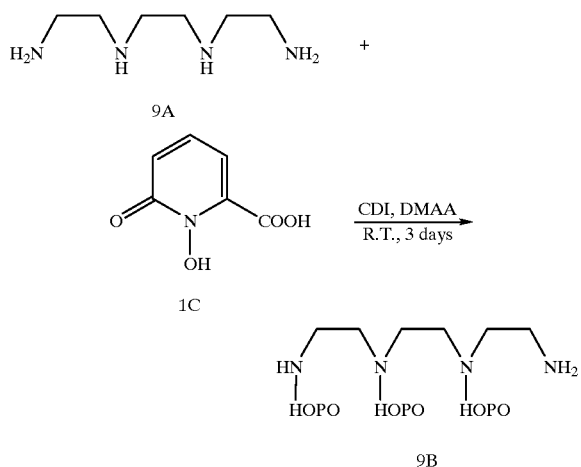

A solution of 1-hydroxy-2-(1H)-pyridinone-6-carboxylic acid (1C) (1.55 g, 10 mmol) from Example 1 in DMAA (50 mL) was stirred for 20 minutes and then a solution of CDI (1.62 g, 10 mmol) in DMAA (50 mL) was added dropwise. The mixture was stirred at room temperature for 2 hrs. Triethylenetetraamine (9A) (0.42 g, 2.86 mmol) was added as the ligand carrier and the resulting mixture was allowed to stir at room temperature for three days as shown in the above reaction scheme. Ligand 9B, as shown, results from the amidation reaction between the 6 carboxylic acid on the HOPO ring with three of the N—H functionalities of the triethylenetetramine. The solvent was evaporated under vacuum at 60° C. and the residue was dissolved into a small amount of methanol. The tris(HOPO)tetraamine (9B) was precipitated by adding ethyl ether into the above methanol solution. After being decanted, the oily product was dissolved in a mixture of methanol and chloroform (1/1). After being filtered, evaporation of solvents give 1.45 g of the tris(HOPO)tetraamine ligand (9B). $^1$HNMR (DMSO-d6)= 9.60 (S 1H) 7.42–7.19 (m, 3H), 6.58–6.25 (m, 6H) 3.74–2.96 (m, 14H), 2.82–2.62 (m, 2H).

Examples 10–12 show the attachment of a HOPO ligand to a solid support by means of a covalent linkage.

Example 10

Attachment of tris(HOPO)tetraamine onto polyacrylate membrane

A polyacrylate membrane (10A) was activated as follows. The pH of 50 mL of double distilled water was adjusted to between 4.5 and 5.1 with 4-morpholine ethane sulfonic acid. Pieces of membrane were put into the above solution. Then 0.35 g of 1-(3-dimethylaminopropyl)-3-ethylcarbodiimide hydrochloride (EDC) (10B) was added. After 5 minutes another 0.35 g portion of EDC was added. After being stirred for 15 minutes at room temperature, the activated membrane was ready for the ligand attachment.

Sufficient tris(HOPO)tetramine of Example 6 (6A) was added to 50 mL of water to form a 0.1 M tris(HOPO) tetramine solution. The above activated membrane pieces were put into the ligand solution and the solution was slowly stirred overnight. The ligand containing membrane pieces were then removed from the reaction mixture and washed with water, then MeOH. After being dried, the ligand containing membrane pieces (10C) were ready for analytical testing.

The composition (10C) prepared by this Example corresponds to Formula 7 wherein M is a polyacrylate membrane, A is an amide linkage covalently bonding M to the L(HOPO)$_3$ ligand which the tris(HOPO)tetramine ligand of Example 6.

Example 11

Ligand Immobilization on Membrane

Immobilization of the macrocycle onto the membrane was carried out in a two step procedure: 1) activation and 2) coupling. The activation procedure involves reaction of carboxylic acid groups on membranes with 1-ethyl-3-(3-dimethylaminopropyl)carbodiimide hydrochloride (EDAC) in water. Two membrane coupons were activated using 0.035 gm EDAC in 5 ml of water, at pH of about 5. The membranes were soaked and stirred in the EDAC solution for five minutes. This was followed by a second EDAC activation step (using fresh EDAC solution) for additional five minutes. In the coupling step, the activated membranes were contacted with 5 ml of ligand solution, containing an excess amount of ligand, and soaked/stirred overnight. The coupling was effective with or without decanting the activation solution.

The process of selectively and quantitatively concentrating and removing a desired ion or group of desired ions present at low concentrations from a plurality of other undesired ions in a multiple ion source solution in which the undesired ions may be present at much higher concentrations comprises bringing the multiple ion containing source solution into contact with a polyhydroxypyridinone-

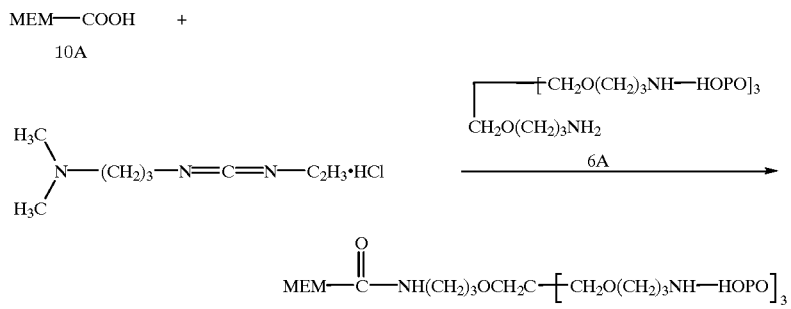

containing membrane support material shown in Formula 7 which causes the desired metal ion(s) to complex with the polyhydroxypyridinone portion of the composition. The desired ion can then, optionally, be dissociated from the complex with a receiving solution which forms a stronger complex with the desired ions than does the polyhydroxypyridinone ligand. The receiving or recovery solution contains only the desired metal ions in a concentrated form. Preferably the hydroxypyridinone ligand membrane support composition will be contained in a cartridge wherein the source and receiving solutions can flow through by gravity. If desired, the flow rate of these solutions can be increased by applying pressure (with a pump) on the top of the cartridge or by applying a vacuum in the receiving vessel.

The hydroxypyridinone-ligand membrane support functions to attract the desired metal cations according to Formula 11:

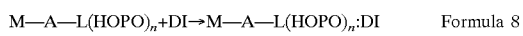

$$M-A-L(HOPO)_n + DI \rightarrow M-A-L(HOPO)_n:DI \qquad \text{Formula 8}$$

Except for DI, Formula 8 is the same as Formula 7 wherein M stands for a membrane, A is a covalent linkage mechanism, and L(HOPO)$_n$ is a ligand comprising a ligand carrier L, and n hydroxypyridinone groups, where n is an integer from 3 to about 6. DI stands for desired ion being removed.

Once the desired metal ions are bound to the polyhydroxypyridinone-containing ligand, they can, optionally, be subsequently removed from the ligand by use of a smaller volume of a receiving liquid according to Formula 9:

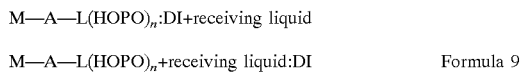

$$M-A-L(HOPO)_n:DI + \text{receiving liquid}$$
$$M-A-L(HOPO)_n + \text{receiving liquid}:DI \qquad \text{Formula 9}$$

The preferred embodiment disclosed herein involves carrying out the process by bringing a large volume of the source multiple ion solution into contact with a polyhydroxypyridinone ligand-membrane support composition of Formula 7 in a membrane cartridge device through which the mixture is first flowed to complex the desired metal ions (DI) with the polyhydroxypyridinone ligand-membrane support composition as indicated by Formula 8 above, followed by the flow through the column of a smaller volume of a receiving liquid, such as an aqueous solution of HBr, HCl, EDTA, NH$_3$, NaCl, NaI, HNO$_3$, H$^+$ or others which either form a stronger complex with the desired metal ion than does the hydroxypyridinone containing ligand bound to the membrane support and/or have greater affinity for the bound ligand under these conditions than does the desired ion. In this manner, the desired metal ions are carried out of the cartridge in a concentrated form in the receiving solution. The degree or amount of concentration will obviously depend upon the concentration of desired metal ions in the source solution and the volume of source solution to be treated. The specific receiving liquid being utilized will also be a factor. Generally speaking, the concentration of desired transition, post-transition, lanthanide or actinide metal ions in the receiving liquid will be from 20 to 1,000,000 times greater than in the source solution. Other equivalent apparatus may be used instead of a cartridge to break the complex and recover the desire metal ion(s). The concentrated desired metal ions are then recovered from the receiving phase by known procedures.

Illustrative of desired transition metal ions which have strong affinities for polyhydroxypyridinone-containing ligands bound to membrane supports are Fe(III) from concentrated 1% to 5% HF and NH$_3$; Pu(IV), Th(IV), Zr(IV) and Hf(IV) from nitric acid solutions; Cu(II), Zn(II), Ni(II), Cd(II), Ni(II), Pb(II), Ag(I), Hg(II) from less acidic feed streams; and 3+ actinides, lanthanides, Al(III), Ga(III) from slightly acidic solutions. This listing of preferred cations is not comprehensive and is intended only to show the types of preferred metal ions which may be bound to polyhydroxypyridinone-containing ligands attached to membrane supports in the manner described above.

Removal of Desired Molecules with Cation-Ligand-Matrix Compositions

The following examples demonstrate how the polyhydroxypyridinone containing ligand bound to a membrane support composition of Formula 7 may be used to concentrate and remove desired ions. The polyhydroxypyridinone ligand-containing membrane support composition is placed in a cartridge. An aqueous source solution containing the desired metal ion or ions, optionally in a mixture of other metal ions which may be in a much greater concentration, is passed through the cartridge. The flow rate for the solution may be increased by applying pressure with a pump on the top of the cartridge or by applying a vacuum in the receiving vessel. After the source solution has passed through the cartridge, a much smaller volume of a recovery solution, i.e. an aqueous solution which has a stronger affinity for the desired metal ions than does the polyhydroxypyridinone-containing ligand, is passed through the cartridge. This receiving solution contains only the desired metal ions in a concentrate form for subsequent recovery. As noted above, suitable receiving solutions can be selected from the group consisting of HBr, HI, HCl, NaI, NaCl, NaBr, Na$_4$EDTA, Na$_3$NTA, NH$_3$, NH$_4$OH, ethylenediamine and mixtures thereof. The preceding listing is exemplary and other receiving solutions may also be utilized, the only limitation being their ability to function to remove the desired metal ions from the polyhydroxypyridinone ligands.

The following examples of separations and recoveries of transition metal ions by the membrane-bound hydroxypyridinone-containing ligands which were made as described in Examples 5 through 11 are given as illustrations. These examples are illustrative only, and are not comprehensive of the many separations of metal ions that are possible using the materials of Formula 7.

Example 12

In this example, several 25 mm diameter circle membrane disks with the tris(HOPO)cyclam ligand of Example 8 attached to a polyacrylate membrane in the manner shown in Example 10 were each placed in a beaker. Each disk was first cleaned with two aliquots of 12.5 ml of ultrapure 37% HCl for 15 minutes each, followed by two aliquots of 12.5 ml of H$_2$O for 15 minutes. Between each step the liquid was decanted off the disk. The disks were then contacted, in washed polypropylene bottles for 24 hours, with various volumes of various concentrations of Fe(III) in 0.5% HF using a shaker machine. The Fe(III) was added from a spectroscopic standard using volumetric pipettes. Ultrapure HF and 18.2 M H$_2$O were used. The original solution and the treated solution (after 24 hours or more) were then analyzed using graphite furnace atomic absorption spectroscopy by known procedures. The results of the leading tests are given in Table 1. The disks were then placed in 5 ml of 37% HCl for 1 hour and the recovered Fe was analyzed using Graphite Furnace and/or Flame Atomic Absorption Spectroscopy. Analysis of the recovery vs. loading data always showed greater than 95% Fe recovery from the Fe loaded to that recovered in the 37% HCl elution or strip.

TABLE 1

Batch Fe Removal Data for Example 12.
Fe Concentration (ppb)

| Start | End |
|---|---|
| 95 | ≦1 |
| 130 | ≦1 |
| 332 | ≦1 |

Example 13

The procedure of Example 12 was repeated, but this time with the tris(HOPO)tetramine ligand of Example 6 attached to the polyacrylate membrane as shown in Example 10. The results of the loading tests are given in Table 2. Analysis of the recovery vs. loading data always showed greater than 95% Fe recovery from the Fe loaded to that recovered in the 37% HCl elution or strip.

TABLE 2

Batch Fe Removal Data for Example 13.
Fe Concentration (ppb)

| Start | End |
|---|---|
| 27 | ≦1 |
| 83 | ≦1 |
| 108 | ≦1 |
| 136 | ≦1 |
| 163 | ≦1 |
| 181 | ≦1 |
| 187 | ≦1 |
| 209 | ≦1 |
| 210 | ≦1 |
| 231 | ≦1 |
| 240 | ≦1 |
| 260 | ≦1 |
| 280 | ≦1 |
| 309 | ≦1 |
| 357 | 1.7 |
| 544 | 1.6 |

Example 14

The procedure of Example 12 was repeated, but this time with the polyhydroxypridinone ligand of Example 7 attached to the polyacrylate membrane. The results of the loading tests are given in Table 3. Analysis of the recovery vs. loading data always showed greater than 95% Fe recovery from the Fe loaded to that recovered in the 37% HCl elution or strip.

TABLE 3

Batch Fe Removal Data for Example 14.
Fe Concentration (ppb)

| Start | End |
|---|---|
| 95 | ≦1 |
| 126 | ≦1 |

Example 15

A 25 mm diameter circle membrane disk of the membrane used in Example 13 was placed in a membrane holder (O-ring and clamp) such as to provide a 17 mm diameter surface available for contact to allow for a solution to be passed through the membrane in a single pass mode. The disk was first cleaned with two 5 ml aliquots of 98% $H_2SO_4$ at a flowrate of 0.1 ml/min followed by an 18.2M M $H_2O$ wash (two by 5 ml aliquots at 0.1 ml/min). The membrane was then loaded with 0.01 mM Zr(IV) as the $NO_3^-$ salt in 5M $HNO_3$ at a flowrate of 0.1 ml/min. The loading data for Zr loading as a function of volume passed through the disk is given in Table 4. The results show that Zr can be reduced to even lower levels from a low level feed even in strong $HNO_3$ and the Zr can be loaded to near the capacity of the membrane disk from such difficult loading conditions. The Zr was then quantitatively recovered (within analytical error) from the disk using 5 ml of 98% $H_2SO_4$. The Zr analysis was performed using Inductively Coupled Plasma Spectroscopy.

TABLE 4

Zr Removal Data for Example 15.
Zr loading on membrane disk from 5 M $HNO_3$ (ppm)

| Sample | ppm Zr |
|---|---|
| Feed solution | 1.01 |
| 0–2.5 ml Effluent | ≦0.1 |
| 2.5–5.0 ml Effluent | ≦0.1 |
| 5.0–10 ml Effluent | 0.70 |
| 10–15 ml Effluent | 1.01 |

From the foregoing, it will be appreciated that the membrane support bound polyhydroxypyridinone-containing ligands of Formula 7 of the present invention provide a material useful for the separation and concentration of the transition, post-transition and actinide metal cations from mixtures of those cations with other metal cations, $H^+$ and soluble complexes such as $F^-$. The metal ions can then be recovered from the concentrated recovery solution by standard techniques known in the art. Similar examples have also been successfully established for many other transition metal ions.

The variety of $L(HOPO)_n$ ligands described by Formula 7 show significant improvement in interaction strength for several specific separations such as Fe from HF. However, particular spacing of the hydroxypyridinone moieties aids in obtaining even greater interaction strengths. For example, the ligands of examples 6, 7, and 8 have greater Fe(III) binding strength under the same conditions than those of examples 5 and 9. Hence, optimal use of the invention in some cases also includes particular spacings compared to others. Such may be readily determined through routine experimentation by one skilled in the art. Additionally, in a minority of cases, such as the complexing of very low concentrations of iron in the presence of high concentrations of fluoride, not all 6 coordination sites may be involved in the complexing of iron. In cases such as this, for example, the iron may bind to only 4 of the coordination sites leaving 2 fluorides bound. However, the ligand is still fully complexed with iron and fluoride and is functional for purposes of the present invention.

Although the invention has been described and illustrated by reference to certain specific membrane-bound polyhydroxypyridinone-containing ligands of Formula 7 and processes of using them; analogs, as above defined, of these hydroxypyridinone-containing ligands are within the scope of the compositions and processes of the invention as defined in the following claims.

What is claimed is:

1. A composition for selectively binding metal ions comprising a polyhydroxypyridinone-containing ligand covalently bonded to a membrane support said membrane-ligand combination having the formula:

M—A—L(HOPO)$_n$ where M is a membrane support, L is a ligand carrier, HOPO is a hydroxypyridinone appropriately spaced on the ligand carrier to provide a minimum of six functional coordination metal binding sites, n is an integer of 3 to 6 and A is a covalent linkage joining L to the membrane surface.

2. A composition according to claim 1 wherein ligand carrier L is configured such that there are at least two atoms on carrier L separating the attached HOPO groups to provide the appropriate stereoconfiguration to optimize the HOPO metal binding sites.

3. A composition according to claim 2 wherein HOPO is a member selected from the group consisting of 3-hydroxy-2(1H)-pyridinone, 1-hydroxy-2(1H)-pyridinone and 3-hydroxy-4(1H)-pyridinone covalently bonded to ligand carrier L through a functionality other than the hydroxy or carbonyl moieties on the pyridinone ring.

4. A composition according to claim 3 wherein A is a covalent linkage selected from the group consisting of amide (NHCO), ester (COO), thioester (COS), carbonyl (CO), ether (O), thioether (S), sulfonate (So$_3$), and sulfonamide (SO$_2$NH)linkages.

5. A composition according to claim 4 wherein M is a member selected from the group consisting of hydrophilic membranes, partially hydrophilic membranes and composite membranes.

6. A composition according to claim 5 wherein M is a hydrophilic membrane.

7. A composition according to claim 6 wherein said hydrophilic membrane is a member selected from the group consisting of polyamides, cellulose, regenerated cellulose, cellulose acetate, and nitrocellulose.

8. A composition according to claim 5 wherein M is a composite membrane.

9. A composition according to claim 8 wherein said composite membrane is poly(tetrafluoroethylene), polyvinylidene fluoride, polyethylene, ultra-high molecular weight polyethylene, polypropylene, polymethylpentene, polystyrene, substituted polystyrenes; polysulfone, polyethersulfone, polyethylene terephthalate, polybutylene terephthalate, polyacrylates, polycarbonates; polyvinyl chloride and polyacrylonitriles.

10. A composition according to claims 6 or 8 where L is a polyamine carrier.

11. A composition according to claim 10 wherein each HOPO group on the L carrier is separated by at least four non-hydrogen atoms.

12. A composition according to claim 11 wherein A is CONH.

13. A composition according to claim 11 where n is 3.

14. A composition according to claim 11 where n is 4.

15. A method for concentrating, removing, and separating selected ions from a source solution comprising the steps of:

(a) contacting said source solution having a first volume with a composition comprising a polyhydroxypyridinone-containing ligand covalently bonded to a membrane support said membrane-ligand composition having the formula:

M—A—L(HOPO)$_n$ where M is a membrane support, L is a ligand carrier, HOPO is a hydroxypyridinone appropriately spaced on the ligand carrier to provide a minimum of six functional coordination metal binding sites, n is an integer of 3 to 6 and a is a covalent linkage formed by the reaction between an activated polar group on the membrane with a functional group on the ligand carrier L; wherein said L(HOPO)$_n$ portion of the composition has an affinity for said selected ions such as to form a complex between said selected ions and said HOPO moieties of said composition;

(b) removing the source solution from contact with said composition to which said selected ions have been complexed; and (c) contacting said composition having said selected ions complexed thereto with a smaller volume of an aqueous receiving solution in which said selected ions are either soluble or which has greater affinity for such selected ions than does the ligand portion of the composition thereby quantitatively stripping such selected ions from the ligand and recovering said selected ions in concentrated form in said receiving solution.

16. A method according to claim 15 wherein, in said composition, said ligand carrier L is configured such that there are at least two atoms on carrier L separating the attached HOPO groups to provide the appropriate stereoconfiguration to optimize the HOPO metal binding sites.

17. A method according to claim 16 wherein, in said composition, HOPO is a member selected from the group consisting of 3-hydroxy-2(1H)-pyridinone, 1-hydroxy-2(1H)-pyridinone and 3-hydroxy-4(1H)-pyridinone covalently bonded to ligand carrier L through a functionality other than the hydroxy or carbonyl moieties on the pyridinone ring.

18. A method according to claim 17 wherein, in said composition, A is a covalent linkage selected from the group consisting of amide (NHCO), ester (COO), thioester (COS), carbonyl (CO), ether (O), thioether (S), sulfonate (SO$_3$), and sulfonamide (SO$_2$NH)linkages.

19. A method according to claim 18 wherein, in said composition, M is a member selected from the group consisting of hydrophilic membranes, partially hydrophilic membranes and composite membranes.

20. A method according to claim 19 wherein, in said composition, M is a hydrophilic membrane.

21. A method according to claim 20 wherein, in said composition, said hydrophilic membrane is a member selected from the group consisting of polyamides, cellulose, regenerated cellulose, cellulose acetate, and nitrocellulose.

22. A method according to claim 19 wherein, in said composition, M is a composite membrane.

23. A method according to claim 22 wherein, in said composition, said composite membrane is poly (tetrafluoroethylene), polyvinylidene fluoride, polyethylene, ultra-high molecular weight polyethylene, polypropylene, polymethylpentene, polystyrene, substituted polystyrenes; polysulfone, polyethersulfone, polyethylene terephthalate, polybutylene terephthalate, polyacrylates, polycarbonates; polyvinyl chloride and polyacrylonitriles.

24. A method according to claims 20 or 22 wherein, in said composition, L is a polyamine carrier.

25. A method according to claim 24 wherein, in said composition, each HOPO group on the L carrier is separated by at least four non-hydrogen atoms.

26. A method according to claim 25 wherein, in said composition, A is CONH.

27. A method according to claim 25 wherein, in said composition, n is 3.

28. A method according to claim 25 wherein, in said composition n is 4.

29. A method according to claim 17 wherein said selected ion is a member selected from the group consisting of transition, post-transition, actinide and lanthanide metal ions.

30. A method according to claim 29 wherein said selected ion is a member selected from the group consisting of transition metal ions, lanthanide series ions and actinide series ions.

31. A method according to claim 30 wherein said selected ions are transition metal ions.

32. A method according to claim 30 wherein said selected ions are lanthanide series ions.

33. A method according to claim 30 wherein said selected ions are actinide series ions.

34. A method according to claim 30 wherein said source solution is a nitric acid solution and said selected ions are members selected from the group consisting of Pu(IV), Th(IV), Zr(IV) and Hf(IV).

35. A method according to claim 30 wherein said source solution is neutral to slightly acidic and said selected ions are members selected from the group consisting of Cu(II), Al(III), Ga(III), Ni(II), Zn(II), Cd(II), Pb(II), Ag(I), and Hg(II).

36. A method according to claim 30 wherein said source solution is a 1 to 5% HF and $NH_4$ solution and said selected ion is Fe(III).

* * * * *